Aug. 28, 1923.

A. A. GAMBLE 1,466,501

MATHEMATICAL BOARD

Filed July 27, 1922

INVENTOR
Albert A. Gamble
BY
Frank Keipes
ATTORNEY

Patented Aug. 28, 1923.

1,466,501

UNITED STATES PATENT OFFICE.

ALBERT A. GAMBLE, OF ROCHESTER, NEW YORK.

MATHEMATICAL BOARD.

Application filed July 27, 1922. Serial No. 577,892.

*To all whom it may concern:*

Be it known that I, ALBERT A. GAMBLE, a citizen of the United States, residing at Rochester, in the county of Monroe and State of New York, have invented certain new and useful Improvements in Mathematical Boards, of which the following is a specification.

The object of this invention is to provide an improved type of mathematical board on which a combination of numbers and color areas are used to find the result of the problem to be figured with the help of the board.

These and other objects of this invention will be fully illustrated in the drawing, described in the specification and pointed out in the claims at the end thereof.

In the accompanying drawing.

In the several figures of the drawing like reference numerals indicate like parts.

Figure 1:
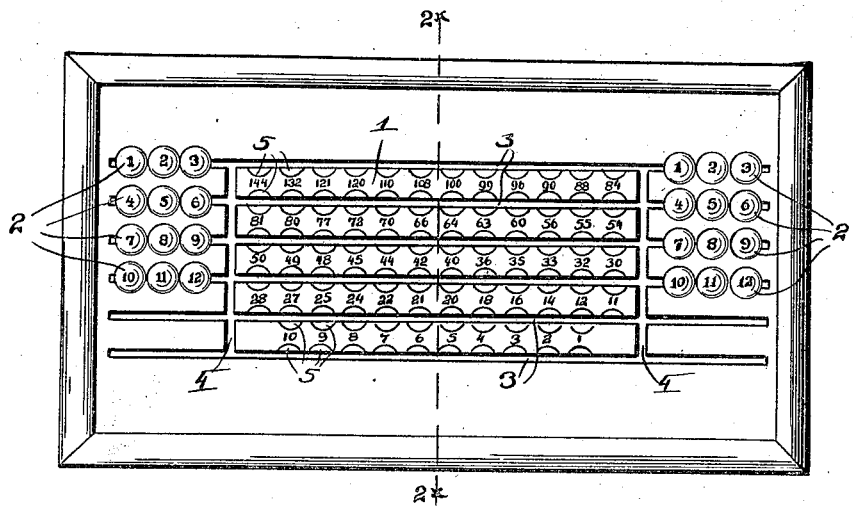
Figure 1 is a top plan view of the board.

Mathematical boards of the type illustrated in the accompanying drawing and forming the subject matter of my present invention are intended for teaching children multiplication. In this mathematical board numbers and colors are so combined and matched that the child will quickly and easily learn to operate the mathematical board and teach himself the multiplication of the numbers given on the board.

As illustrated in the drawing, the mathematical board is made up of a table 1 containing the numbers giving the result of the multiplication of two factors taken from the numbers 1 to 12 inclusive contained on the movable buttons 2, 2. These buttons are adapted to slide in suitable tracks 3 located adjacent to the numbers on the table 1 each number on the table 1 having a track 3 located at the top and bottom thereof. As the numbers on the table 1 are placed in a series of parallel rows the tracks 3 form a corresponding series of parallel rows at the top and bottom of each of the numbers. In addition to these parallel tracks 3, a track 4 running at right angles to the tracks 3 is located at the beginning and end of the rows of numerals of the table 1. These additional tracks join the tracks 3, 3 at each end thereof so that the buttons 2, 2 can be moved in the tracks from one row to any of the other rows of numerals.

For the purpose of providing space for the buttons 2, 2 when not being used for calculation, each of the tracks 3, 3 is extended to the right and left of the tracks 4, 4 respectively so that the buttons can be placed into these extensions leaving the table 1 clear.

As illustrated in Figure 1 two series of twelve buttons marked from 1 to 12 inclusive are used on the mathematical board. For convenience in the operation of the board one of each of these two series is located on each side of the table. The buttons 2 are colored so that each number in the two series will have a corresponding color, thus the buttons containing the numbers 12 for example may be colored pink.

The colors of the buttons are also contained in small color areas 5, 5 adjacent to the numbers on the table 1. These color areas 5 are so distributed over the table 1 that color areas of a certain color are located adjacent to a number on the table 1 of which the number of a similarly colored button 2 is a factor. Thus in the case of the pink colored buttons marked 12 it will be found that any number on the table 1 of which 12 is a factor will have a pink color area 5 located at either the top or bottom or both the top and bottom. For example the numeral 144 contained at the left hand end of the top row of numerals of the table 1 will have a pink color area at the top and bottom thereof. The next number 132 will have a pink color area 5 at the top and a blue color area 5 at the bottom corresponding to the blue buttons 2 containing the numbers 11. This color scheme of the color areas 5 and corresponding colored buttons 2 is carried throughout the table 1 so that the child will at a glance be able to pick out the numbers on the buttons which are factors in a predetermined number on the table by simply matching the color area 5 of the number with the correspondingly colored buttons 2. The board as illustrated in Figure 1 and as above pointed out is provided with a combination of but two colors for each number on the table. This means that only two factors taken from the numerals 1 to 12 of the buttons can be matched for each of these numbers. This excludes other combinations of factors that are possible for several of the numbers. Thus for example the number 36 can be made up with a combination of the factors 3 and 12, 4 and 9, 6 and 6. Only one of these can be made up on the mathematical board as illustrated. In order to make the other combinations possible, three different color areas must be placed adjacent to the number 36 and distinguished from each other as above indicated. Of course only one pair of these factors could be matched in this way at a time and for this reason the combination of but two factors is illustrated for each number in order to make the mathematical board more readily understood.

To teach multiplication this combination of colors and numbers is used as follows. As above described the numeral 144 on the table 1 has a pink color area 5 located at the top and bottom thereof. The child therefore takes two buttons 2 which are correspondingly colored and moves them in the tracks 3 and 4 until one of them is located adjacent to one of the pink color areas and the other is located adjacent to the other color areas. When this is done the child will notice that each of the pink colored buttons contains the number 12 showing that by multiplying 12 by 12 the result will be 144 as given on the table.

In a case of the number 132 a pink and a blue button one at the top and the other at the bottom of the number must be used to match the color areas 5 for this number. When this is done it will be found that the blue button contains the numeral 11 and the pink button, the numeral 12 indicating that the 11 times 12 is 132 as given on the table.

Figure 2:
Figure 2 is a vertical transverse section of the board, the section being taken on the line $2^x$—$2^x$ of Figure 1.
Figure 4:
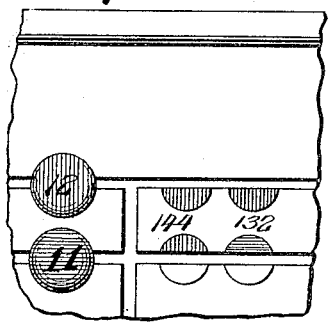
Figure 4 is a detail of Fig. 1 on enlarged scale showing a plurality of colored buttons and areas.
Figure 3:
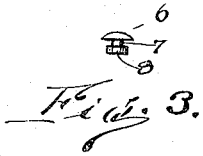
Figure 3 is a detail view of one of the buttons used for multiplying on the board.

The buttons 2 are made as illustrated in Figure 3 having a curved rounding top 6, a neck 7 of reduced diameter and a cylindrical form of an inverted T slot cut into or built up in the mathematical board, and the buttons 2 are adapted to engage into these T slots as illustrated in Figure 2. This engagement of the buttons with the slots forming the tracks serves to guide the buttons over the whole system of tracks 3 and 4 and prevents their disengagement therefrom.

I claim:

1. In a calculating board, the combination of a table of numbers, color areas placed adjacent to numbers on said table, colored buttons containing numbers, the colors of said buttons corresponding to said color areas adjacent to the numbers on said table, the color areas adjacent to each of said numbers indicating the numerals of the corresponding colored buttons which are factors of the respective numbers.

2. In a calculating board, the combination of a table of numbers, color areas placed adjacent to numbers on said table, colored buttons containing numbers, the colors of said buttons corresponding to said color areas adjacent to the numbers on said table, the color areas adjacent to each of said numbers indicating the numerals of the corresponding colored buttons which are factors of the respective numbers, tracks adjacent to said color areas to guide said buttons to said color areas.

In testimony whereof I affix my signature.

ALBERT A. GAMBLE.